United States Patent [19]
Schlegel et al.

[11] 3,968,947
[45] July 13, 1976

[54] LAUNCHING APPARATUS FOR FLYING DEVICE

[75] Inventors: William R. Schlegel, Wilmington, Del.; John J. Hennessey, Springfield, Pa.

[73] Assignee: All American Industries, Inc., Tomaston, Conn.

[22] Filed: Jan. 14, 1975

[21] Appl. No.: 540,864

[52] U.S. Cl. .................................. 244/63; 46/81
[51] Int. Cl.² .......................................... B64F 1/06
[58] Field of Search ................. 244/63; 46/74 B, 81; 60/632; 124/11 R

[56] References Cited
UNITED STATES PATENTS

| | | | |
|---|---|---|---|
| 1,388,361 | 8/1921 | LeMesurier | 244/63 |
| 1,797,514 | 3/1931 | Richter | 244/63 |
| 1,802,649 | 4/1931 | Heinkel | 244/63 |
| 1,888,418 | 11/1932 | Adams | 244/63 X |
| 2,083,805 | 6/1937 | Adams | 244/63 |
| 2,497,916 | 2/1950 | Stambaugh | 244/63 |
| 2,516,902 | 8/1950 | Musser | 244/63 X |
| 2,923,504 | 2/1960 | Ortega et al. | 244/63 X |

FOREIGN PATENTS OR APPLICATIONS

| | | | |
|---|---|---|---|
| 327,101 | 5/1930 | United Kingdom | 244/63 |
| 546,572 | 7/1942 | United Kingdom | 244/63 |

Primary Examiner—Trygve M. Blix
Assistant Examiner—Barry L. Kelmachter
Attorney, Agent, or Firm—Connolly and Hutz

[57] ABSTRACT

A pneumatic launching apparatus for a lightweight aircraft has a battery of three pneumatic tubes mounted upon a hydraulic piston and cylinder assembly. A launching tube is mounted on the central pneumatic tube, which blows it away from it in a manner similar to that in which a tubular paper cover is blown off a drinking straw. The outer tubes provide additional storage for compressed air and support the outer ends of a launching carriage, which slides over them. The aircraft is mounted on the carriage by a pair of brackets which react against the aircraft in a forward-moving direction. Restraining shock absorbers are mounted across the front ends of the outer tubular rails in the path of movement of the carriage for arresting it. The pressure is exhausted from the system just before the carriage strikes the shock absorbers either by uncovering perforations in the central tubular rail or actuating a dump valve in the pneumatic system. The restraining system and shock absorbers may be eliminated and the carriage simplified by discharging the launching tube with the aircraft, which subsequently releases it.

25 Claims, 7 Drawing Figures

U.S. Patent  July 13, 1976  Sheet 1 of 3  3,968,947
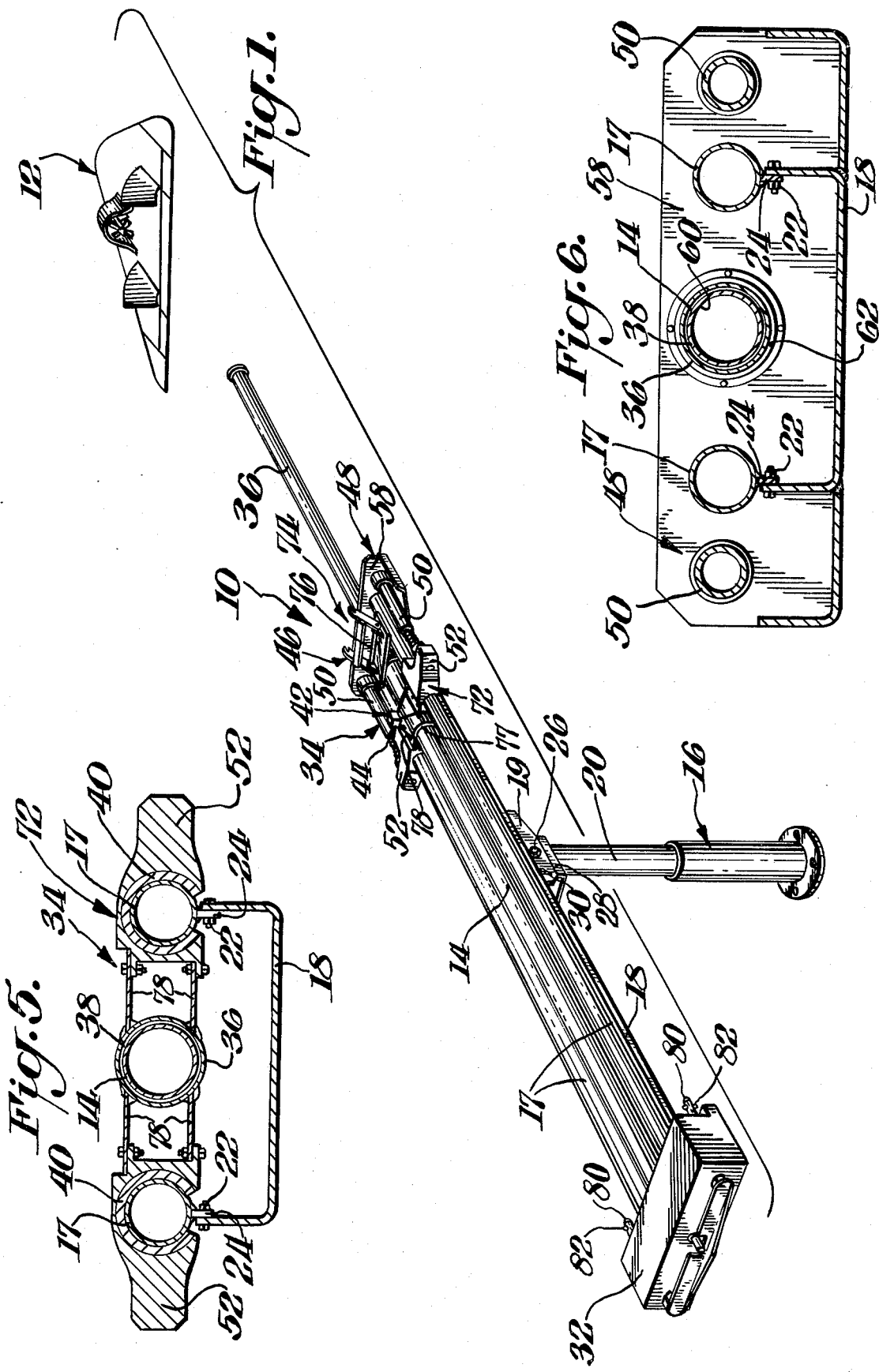

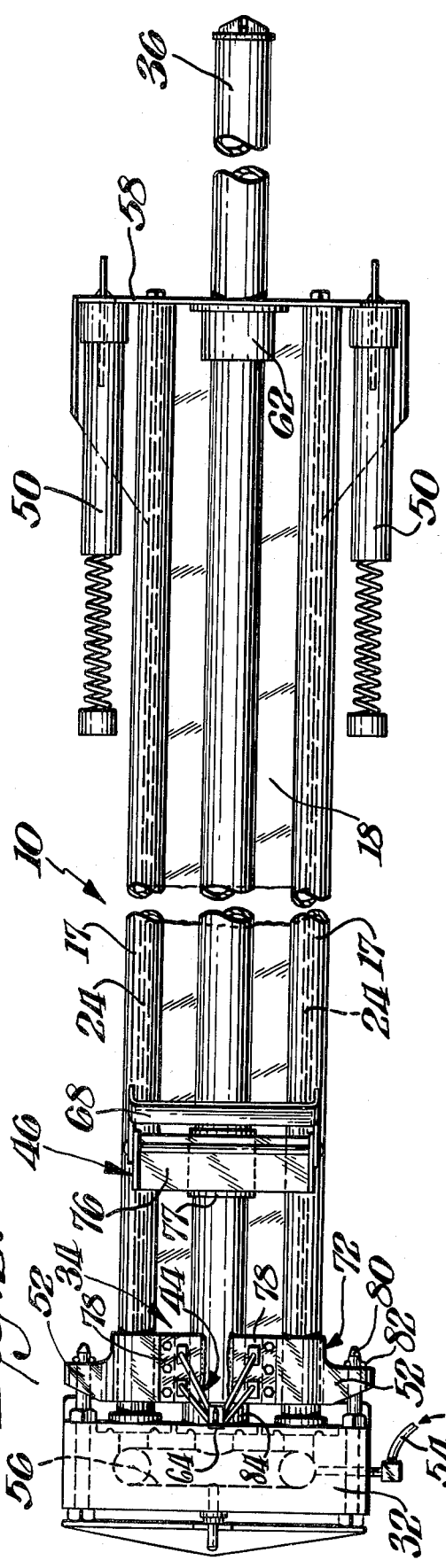

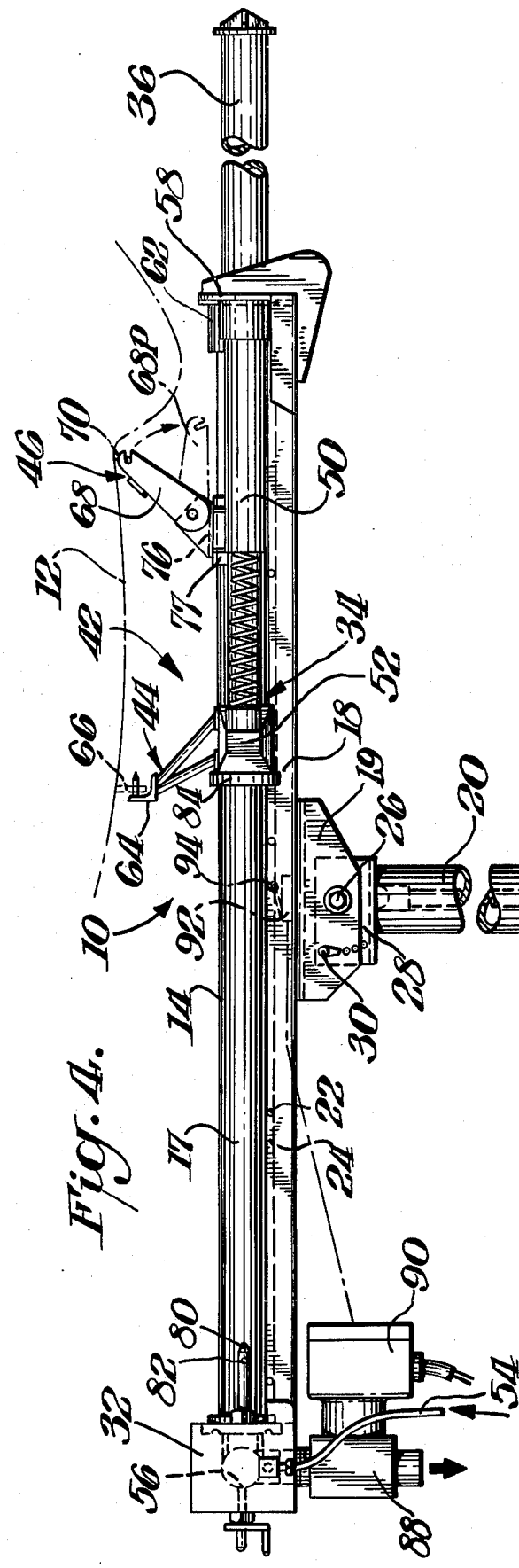
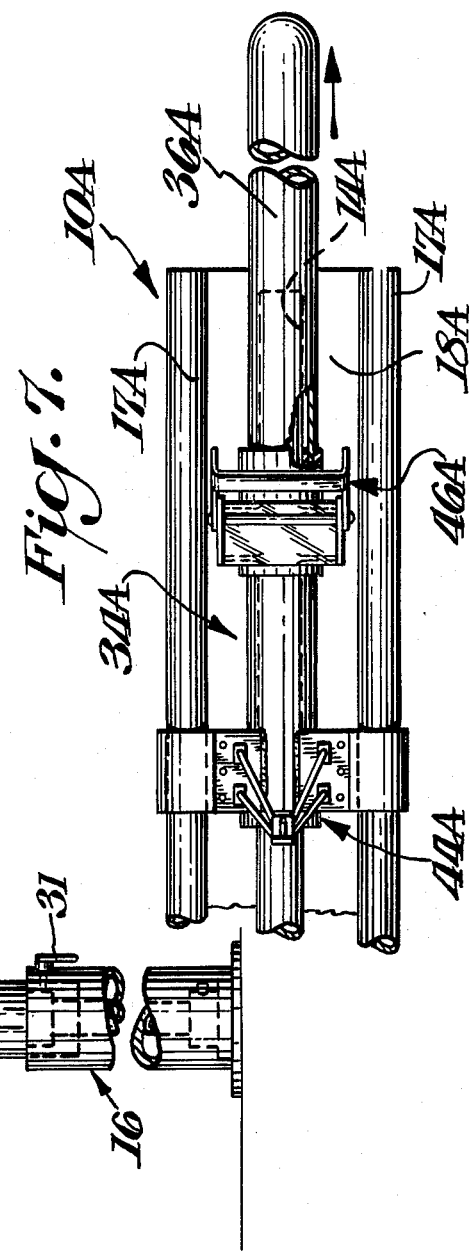

LAUNCHING APPARATUS FOR FLYING DEVICE

BACKGROUND OF THE INVENTION

Preexisting aircraft launching devices or catapults are relatively complicated and expensive, because of heavy weight, a great number of moving parts, complications in attaching a moving carriage to a piston through the walls of a pressure-containing cylinder and the complications in valve operation which are subject to malfunctions and frosting. An object of this invention is to provide a simple and economical launching apparatus for a flying device, which is dependable in operation and freely maneuverable.

SUMMARY OF THE INVENTION

In accordance with this invention a launching apparatus for a flying device comprises an elongated rail having rear and front ends. An elongated launching tube having a rear open end and a closed front end is mounted upon said rail with its closed end disposed adjacent the front end of said rail and a hollow space between the launching tube and said rail. A source of pressurized fluid is connected to the hollow space. Latching means secures the open end of the launching tube adjacent the rear end of the rail for restraining the launching tube on the rail against the force of said pressurized fluid. Bracket means on the launching tube connects the forward motion of the launching tube to the flying device. Latch release means causes the launching tube to be propelled forward in response to the expansion of the pressurized fluid whereby a connected flying device is rapidly propelled towards and past the front end of said rail to launch it into the air. The connecting bracket may be mounted on a carriage which is arrested by shock absorbers connected to outer tubular rails which store pressurized fluid to be utilized in the central rail, which also may be tubular. The pressurized fluid may be exhausted prior to arrestment of the carriage, such as by uncovering exhaust holes in the central tubular rail. This provides a highly simple, economical and maneuverable launching apparatus in which all of the major components are stressed in tensions, thus avoiding drastic column loads. Valve complications are eliminated by the simple expansion of the pressurized fluid automatically obtained as the launching tube uncovers the central pressurized tubular rail and ultimately exhausts the pressure through perforations uncovered in the front end of the rail.

BRIEF DESCRIPTION OF THE DRAWING

Novel features and advantages of the present invention will become apparent to one skilled in the art from a reading of the following description in conjunction with the accompanying drawings wherein similar reference characters refer to similar parts and in which:

FIG. 1 is a three-dimensional view of one embodiment of this invention in the launched position launching an unmanned aircraft;

FIG. 2 is a top plan view of the apparatus shown in FIG. 1 in the ready position;

FIG. 3 is a top plan view in the apparatus shown in FIGS. 1 and 2 in the launched position;

FIG. 4 is a side view in elevation of the apparatus shown in FIG. 3;

FIG. 5 is a cross sectional view taken through FIG. 3 along the line 5—5;

FIG. 6 is a cross sectional view taken through FIG. 3 along the line 6—6; and

FIG. 7 is a partial top plan view of a modification of the apparatus shown in FIGS. 2 and 3, which discharges the launching tube along with the aircraft.

DESCRIPTION OF THE PREFERRED EMBODIMENTS

In FIG. 1 is shown a launching apparatus 10 for a flying device 12, such as an unmanned lightweight aircraft 12, which is shown just after it has been launched from apparatus 10. FIG. 1 illustrates the major components of apparatus 10 including an elongated tubular rail 14 mounted upon vertically adjustable support 16, which is for example an elevating piston and cylinder assembly similar to those utilized in automobile service stations and it is hydraulically actuated. Central tubular rail 14 together with outer tubular rails 17 disposed substantially parallel to each other, are connected by yoke 18 and inverted U-shaped channel bracket 19 to inner stanchion sleeve 20 of support 16. As shown in FIG. 5, yoke 18 is attached by nut and bolt assemblies 22 to lower ribs 24 on outer tubes 17. Pivot 26 through inverted U-shaped channel bracket connects yoke 18 and outer tubular rails 17 to saddle 28, which is secured on the top of piston 20. The various inclined positions of yoke 18 and attached tubular rails 17 relative to saddle 28 are obtained by manipulation of manual lock 30. Central tubular rail 14 and launching tube 36 are also indirectly attached to yoke 18 as later described and are disposed in a battery with outer tubular rails 17. The rear ends 19 of tubular rails 14 and 17 are connected, as later shown in detail to manifold head 32, to which a source of pressurized fluid (such as compressed air) is connected as later shown in detail. Rear ends 19 thus constitute conduit means directly connecting tubular rails 14 and 17 to manifold head 32.

Launching carriage 34 is secured to launching tube 36 which slides over central tubular rail 14, and it is propelled forward to the illustrated launched position by compressed air supplied through the interior of tubular rail 14. Clearance space 38 (shown in FIGS. 5 and 6) exist, between tubular rail 14 and launching tube 36. Launching carriage 34 is stabilized by circular bearing shoes 40 disposed around outer tubular rails 17. Shoes 40 are, for example, made of bronze (or a non metal such as Teflon or a phenolic plastic) which freely slides over stainless steel tubular rails 17, which are for example made of stainless steel tubing having a wall thickness of 0.030 inch, a yield strength of 35,000 psi and an ultimate strength of 45,000 psi. Central rail 14 also has similar characteristics, for example. An aircraft connecting bracket 42 is centrally mounted on carriage 34 and includes a rear aircraft support 44 and a front aircraft support 46, which engage the aircraft as later described to propel it forward at launching speed. The forward motion of carriage 34 is arrested by restraining means 48 including recoil springs 50, which engage shoulders 52 extending outwardly from carriage 34.

FIG. 2 shows the ready position of apparatus 10 in which carriage 34 is disposed in the rear position adjacent manifold header 32 to which compressed air is supplied through compressed air hose 54. The compressed air is supplied into internal cavity 56 within header 32 and thereby channelled into tubular rails 14 and 17 connected thereto. The front ends of outer tubular rail 17 are covered by front plate 58 of restrainer 48, but the front end 60 of central tube 14 is open within launching tube 36 to supply compressed air for propelling launching tube 36 in a forward direction. Launching tube 36 extends within front tubular guide 62 in the middle of retainer plate 58 for guiding the forward movement of launching tube 36. Guide tube 62 is for example also made of bronze to help stainless steel tube 36 slide back and forth within it.

Details of an example of carriage 34 are shown in FIGS. 2, 3 and 4. It supports rear bracket 64, which engages a rear support fitting 66 on a hard point below aircraft 12 and a pivoted front hook plate 68 which engages a fitting 70 on another hard point of aircraft 12, slightly forward of its center of gravity. Hook plate 68 is resiliently biased to drop forward to the phantom position designated 68P to avoid interference with the forward motion of the launched aircraft.

Carriage 34 accordingly includes a rear shouldered guide runner assembly 72 and a front hook plate assembly 74 rotatably supporting hook plate 68 on base plate 76. Base plate 76 is secured through collar 77 to launching tube 36. Rear carriage guide assembly 72 is connected to launching tube 36 by upper and lower bridging plates 78 shown in FIG. 5.

The ready position of apparatus 10 shown in FIG. 2 has recoil springs 50 fully extended in position to receive the front ends of carriage shoulders 52, as later shown in FIG. 3. In FIG. 2 latching rod assemblies 80 have pins 82 disposed in front of shoulders 52 to maintain the open end 84 of launching tube 36 in sealed contact with the front face of manifold head 32. The seal is accomplished by any effective type of circular seal 53, acting as a face or radial seal (effective only over first portion of stroke to minimize seal drag over major portion of stroke), which is for example, a non-metallic cheveron seal. Other suitable circular seals are: O-ring, labyrinth or piston ring types. Apparatus 10 is pressurized, latches 80 are then released by withdrawing pins 82 to cause launching tube 36 and attached carriage 34 to move from the position shown in FIG. 2 to that shown in FIG. 3 with shoulders 52 of carriage 34 arrested by recoil springs 50.

FIG. 3 shows that open end 84 of launching tube 36 has moved past to uncover exhaust holes 86 in the periphery of central tubular rail 14 to dump or exhaust the compressed air within the system. Pressure dumping can also be accomplished by dump valve 88 connected to cavity 56 in manifold 32. Dump valve 88 is actuated by solenoid 90, which is electrically connected to microswitch 92 having an actuating arm 94 disposed in the path of movement of carriage 34. Microswitch 92, therefore, opens dump valve 88 when a shoulder 52 on carriage 34 depresses microswitch arm 94 as carriage 34 approaches restrainer 48 to thus facilitate the arrestment of carriage 34. The position of microswitch 92 is adjustable relative to the length of the launcher to provide various end-speed vs. peak acceleration limits.

FIG. 4 shows details of elevating piston cylinder assembly 16 and manual control 30 for adjusting the angular position of inverted U-shaped channel bracket 19 upon saddle 28 to adjust the inclination of rails 14 and 17 of launching apparatus 10. The azimuth of bracket 19, yoke 18 and tubular rails 14 and 17 is varied to launch into the wind by manually rotating them and inner stanchion sleeve 20 about the base of adjustable support 16. Rotational locking is, for example, actuated by locking lever 31.

In FIG. 7 is shown a modified launching apparatus 10A in which launching tube 36A is permanently connected to carriage assembly 34A and no restraint facilities are provided at the ends of outer tubular rails 17A. Launching tube 36A and attached carriage 34A are accordingly discharged together with an aircraft 12A not shown, and they subsequently separate from the aircraft and drop to the ground. In this form of operation, the launching tube and carriage assembly may be recovered or may be expendable. An expendable launching tube is made, for example, of a relatively air-tight material, such as a synthetic polymer, for example nylon or "Kevlar", the trademark for an ultra high strength, high modulus of elasticity textile fiber, made by E. I. duPont deNemours and Co. of Wilmington, Delaware. Launching tube 36A may also be made of a wire cloth sealed by vinyl impregnation.

The principal advantages of the linear pneumatic concentric tube launcher 10 are:

1. A compact simple device to achieve controlled acceleration of objects, weapons and vehicles such as light weight aircraft for takeoff from limited spaces.
2. Movement of only one major component, the outer tube, during the launch (power) stroke.
3. Highly efficient pressurized expansion cycle obtained by elimination of opening and/or controlling of valves during launch stroke.
4. Adaptability for high cycling for repetitive operations.
5. Highly predictable and scalable design to meet energy (force-stroke) requirements for a wide range of applications.
6. Concentric tube concepts permits use of a variety of outer (moving) tube materials from rigid metals and plastics to air-tight flexible materials, e.g., fire hoses, the ability to use alternate outer tube materials allows for lighter weights and consideration of throw away (expendable) launch tubes.
7. The designs lends itself to disassembly into small components for mobility and storage, e.g., tube assemblies capable of being formed by threaded assemblies.
8. Although the device primarily uses readily available energy such as obtained from compressed dry air and gases, e.g., nitrogen, it is directly adaptable to chemically created pressurized gas generation such as controlled burning pyrotechnic devices.

Specific applications of the linear pneumatic concentric tube launcher 10 are:

1. Launching of unmanned powered and unpowered lightweight aircraft not capable of taking off on a runway, e.g. aircraft having no landing gear.
2. Launching of self-propelled weapons from confined areas, e.g., "zero length" concept.
3. Controlled acceleration of objects and vehicles for test purposes.
4. Rapid erection of structures and members, e.g., railway crossing barriers.

Launcher 10 is designed on the basic principle of direct expansion of precharged, pressurized air or (gases) within a cylindrical tube assembly consisting of two concentric pressure tight tubes capable of linear motion relative to each other during an expansion cycle.

Initially, the system of launching apparatus 10 is pressurized to approximately 250 psi and has a total storage capacity of approximately 3 cubic feet. The final extended capacity is approximately 3.8 cubic feet and the pressure drops on extension of the system to approximately 185 psi. The operation of apparatus 10, therefore, provides a relatively low change in the ratio of final to initial volume. This avoids a marked temperature drop in the contained compressed air thus preventing significant frosting.

Operation of springs 50 automatically rebounds carriage 34 to the initial position upon which it becomes latched on latching rods 80. Apparatus 10, therefore, has an extremely rapid recycle time and is ready for practically immediate reoperation after each launch. "Reoperation" or recycle time is, however, limited by gas source and time to load and ready aircraft for flight.

Some versions of launcher have elevating support column, some do not. Two configurations of recoil spring/shock absorbers are significant. One has a recoil spring to store most of the residual outer launch tube energy in conjunction with a shock absorber both mounted at the launch end with another shock absorber at battery to attenuate the balance of outer tube energy at latching. The second stores all of the outer tube energy in springs (either mechanical or air cylinders) and attenuates all of the energy with shock absorbers mounted at battery.

Clearance between inner diameter of outer tube 36 and inner tube 14 is relatively large. Continuous bearing bridging gap between inner and outer tubes and affixed to outer acts as bearing and allows some non-straightness and out-of-round of tubes. A similar bearing affixed to outer diameter of launcher end of inner tube, but discontinuous, functions similarly. This bearing must be discontinuous in order to utilize the intra tube volume as essential launcher volume, and flow occurs from this intermediate chamber during the launch stroke. Any considerable restriction will retard launching due to increasing compression.

The stroke of launching tube 36 may be considerably shortened to ½ or even ⅓ of the travel of the launching carriage 34 by connecting the launching tube to the carriage through a pulley and cable arrangement, such as shown in U.S. Pat. No. 1,797,514 or 1,388,361. In such arrangements the initial position of the launching carriage is disposed in back of the head of the launching tube. A cable is anchored to the rear of the launching tube assembly and reeved over a pulley mounted in front of the launching tube back to the launching carriage. As the launching tube moves forward, the launching carriage is pulled forward over a distance which is a multiple of the forward movement of the launching tube. The single pulley arrangement of U.S. Pat. No. 1,388,361 accordingly provides double the throw of the launching tube and the double pulley arrangement of U.S. Pat. No. 1,797,514 provides triple the throw of the launching tube. The launching tube may also be mounted either around the outside of the guide tube or inside the guide tube. Outer tubular rails 17 provide guidance for launching carriage 34, which is either directly connected to launching tube 36 as shown herein or indirectly connected over pulleys and cables as described in the aforementioned two patents.

We claim:

1. A launching apparatus for a flying device comprising an elongated telescopic tube assembly, said telescopic tube assembly being mounted upon a support and having rear and front ends, said telescopic tube assembly having a rear open end and a closed front end having at least one stationary tube and at least one movable launching tube, a hollow space within said telescopic tube assembly, a base, a receiver of pressurized fluid being directly connected to said hollow space by conduit means, said conduit means having cross-sectional area large enough to substantially prevent throttling when said pressurized fluid expands, latching means securing said launching tube to said base for restraining said launching tube to said base against the force of said pressurized fluid, bracket means on said launching tube for connection of the forward motion of said launching tube to said flying device, latch release means connected to said latching means for allowing said launching tube to be propelled forward in a full launching stroke in response to the expansion of the pressurized fluid whereby said flying device connected to said launching tube is rapidly propelled toward and past said front end of said telescopic tube assembly to launch said flying device into the air, said receiver of pressurized fluid being sufficient in conjunction with said hollow space to provide said full launching stroke, a source of pressurized fluid connected to said receiver and said latch release means being actuated after said receiver and telescopic tube assembly are charged with said pressurized fluid.

2. An apparatus as set forth in claim 1, wherein said launching tube is mounted to slide over said stationary tube.

3. An apparatus as set forth in claim 1 wherein said receiver of pressurized fluid includes a head connected to the rear of said telescopic tube assembly for supplying said pressurized fluid within it.

4. An apparatus as set forth in claim 3, wherein said head comprises a manifold having a central outlet and a pair of outer outlets, said telescopic tube assembly being connected to said central outlet, a pair of outer tubular rails being connected to said outer outlets, said outer tubular rails being disposed substantially parallel to each other and said telescopic tube assembly, and said outer tubular rails having closed front ends whereby storage is provided for said pressurized fluid to comprise said receiver.

5. An apparatus as set forth in claim 4, wherein said bracket means comprises a carriage mounted adjacent the open end of said launching tube, and rearwardly disposed projections on said carriage for engaging said flying device and urging said flying device to move in a direction from the rear to the front end of said telescopic tube assembly.

6. An apparatus as set forth in claim 5, wherein restraining means is mounted on the front end of said telescopic tube assembly in the path of movement of said carriage for contacting said carriage and terminating movement of said carriage.

7. An apparatus as set forth in claim 6, wherein shock absorbing means is mounted between said restraining means and said carriage.

8. An apparatus as set forth in claim 7, wherein exhaust means is connected to said hollow space, and control means is connected to said exhaust means to cause said pressurized fluid to be exhausted from said hollow space when said carriage moves closely adjacent to said restraining means.

9. An apparatus as set forth in claim 8, wherein said exhaust means and control means are comprised of openings in said telescopic tube assembly disposed in a position to be uncovered by movement of the launching tube when said carriage approaches said restraining means.

10. An apparatus as set forth in claim 8, wherein the exhaust means comprises a dump valve connected to the receiver of pressurized fluid and a switch disposed in the path of movement of said carriage.

11. An apparatus as set forth in claim 4, wherein said latching means comprises a pin and shoulder connecting means.

12. An apparatus as set forth in claim 4, wherein said support comprises a vertically movable support.

13. An apparatus as set forth in claim 12, wherein said vertical movable support comprises a piston and cylinder assembly.

14. An apparatus as set forth in claim 13, wherein said support also comprises a pivoted yoke mounting said telescopic tubular assembly upon said piston and cylinder assembly.

15. An apparatus as set forth in claim 1, wherein said bracket means comprises a carriage mounted adjacent the open end of said launching tube and rearwardly disposed projections on said carriage for engaging said flying device and urging said flying device to move in a direction from the rear to the front end of said apparatus.

16. An apparatus as set forth in claim 15, wherein restraining means is mounted on the front end of said apparatus in the path of movement of said carriage for contacting said carriage and preventing said carriage from moving off the front end of said apparatus.

17. An apparatus as set forth in claim 16, wherein shock absorbing means is mounted between said restraining means and said carriage.

18. An apparatus as set forth in claim 17, wherein exhaust means is connected to said hollow space and arresting control means is connected to said exhaust means to cause said pressurized fluid to be exhausted from said hollow space when said carriage moves closely adjacent to said restraining means.

19. An apparatus as set forth in claim 18, wherein said exhaust means and arresting control means are comprised of openings in said telescopic tube assembly disposed in a position to be uncovered by movement of the launching tube when said carriage approaches said restraining means.

20. An apparatus as set forth in claim 18, wherein the exhaust means comprises a dump valve connected to the receiver of pressurized fluid and a switch disposed in the path of movement of said carriage.

21. An apparatus as set forth in claim 1, wherein said latching means comprises a pin and shoulder connecting means.

22. An apparatus as set forth in claim 1 wherein said support comprises a vertically movable support.

23. An apparatus as set forth in claim 22, wherein said vertical movable support comprises a piston and cylinder assembly.

24. An apparatus as set forth in claim 23, wherein said support also comprises a pivoted yoke mounting said telescopic tubular assembly upon said piston and cylinder assembly.

25. An apparatus as set forth in claim 24 wherein said piston and cylinder assembly also permits rotation of said apparatus about a substantially vertical axis.

* * * * *